(12) United States Patent
Deshpande et al.

(10) Patent No.: US 10,296,215 B2
(45) Date of Patent: May 21, 2019

(54) EFFICIENT EXPORT SCHEDULING USING INDEX AND SCHEMA TO DETERMINE DATA DISTRIBUTION

(71) Applicant: International Business Machines Corporation, Armonk, NY (US)

(72) Inventors: Umesh Deshpande, San Jose, CA (US); Paul H. Muench, San Jose, CA (US); Mohit Saxena, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 88 days.

(21) Appl. No.: 15/464,101

(22) Filed: Mar. 20, 2017

(65) Prior Publication Data

US 2018/0267710 A1    Sep. 20, 2018

(51) Int. Cl.
*G06F 12/00* (2006.01)
*G06F 13/00* (2006.01)
(Continued)

(52) U.S. Cl.
CPC ............ *G06F 3/0604* (2013.01); *G06F 3/067* (2013.01); *G06F 3/0638* (2013.01);
(Continued)

(58) Field of Classification Search
CPC .... G06F 3/0655; G06F 3/0656; G06F 3/0647; G06F 3/0646
(Continued)

(56) References Cited

U.S. PATENT DOCUMENTS 8,055,970 B1 * 11/2011 Smith ................... H04L 9/3236
714/752
9,438,665 B1    9/2016 Vasanth et al.
(Continued)

FOREIGN PATENT DOCUMENTS

| WO | 2012154998 A1 | 11/2012 |
| WO | 2015005745 A1 | 1/2015 |
| WO | 2016019833 A1 | 2/2016 |

OTHER PUBLICATIONS

Hu et al., "A Real-Time Scheduling Algorithm for On-Demand Wireless XML Data Broadcasting", Journal of Network and Computer Applications, 68, 2016, pp. 151-163.

*Primary Examiner* — Edward J Dudek, Jr.
*Assistant Examiner* — Sidney Li
(74) *Attorney, Agent, or Firm* — Zilka-Kotab, P.C.

(57) ABSTRACT

In one embodiment, a method includes determining a data record partition size based on resources used for transferring data from a higher storage tier to one or more lower storage tiers. The method also includes determining which data records stored to the higher storage tier are suitable for export to the one or more lower storage tiers, determining a distribution mapping of the first memory, the distribution mapping indicating a relative distribution of storage locations for all of the data records that are stored to the higher storage tier, identifying all sets of contiguously stored data records on the higher storage tier that are suitable for export and greater in size than the data record partition size, logically sorting, in a descending order of size, the sets of contiguously stored data records, and sending a list of logically sorted sets of contiguously stored data records to an exporter.

13 Claims, 5 Drawing Sheets

(51) Int. Cl.
*G06F 13/28* (2006.01)
*G06F 3/06* (2006.01)
*G06F 17/30* (2006.01)

(52) U.S. Cl.
CPC ...... *G06F 3/0649* (2013.01); *G06F 17/30339*
(2013.01); *G06F 3/0646* (2013.01); *G06F
3/0647* (2013.01); *G06F 3/0655* (2013.01);
*G06F 3/0656* (2013.01)

(58) Field of Classification Search
USPC .......................................................... 711/117
See application file for complete search history.

(56) References Cited

U.S. PATENT DOCUMENTS

| | | |
|---|---|---|
| 9,489,443 B1 | 11/2016 | Muniswamy-Reddy et al. |
| 2010/0121828 A1* | 5/2010 | Wang ................ G06F 17/30233 |
| | | 707/694 |
| 2012/0131139 A1 | 5/2012 | Siripurapu et al. |
| 2015/0269239 A1 | 9/2015 | Swift et al. |
| 2016/0202933 A1* | 7/2016 | Alatorre ................ G06F 3/0647 |
| | | 711/154 |

\* cited by examiner

EFFICIENT EXPORT SCHEDULING USING INDEX AND SCHEMA TO DETERMINE DATA DISTRIBUTION

BACKGROUND

The present invention relates to management of Internet of Things (IoT) devices, and more particularly, to efficient export scheduling of IoT data using index and schema.

Applications that manage IoT devices typically perform real-time and deep analytics to optimize machine and human-machine systems on which the IoT devices participate. However, real-time analytics require high-speed, low-latency memory types to store the IoT data that is significantly more expensive to purchase and maintain than other traditional memory types. On the other hand, deep analytics require vast amounts of data storage (and data collected and stored thereon), and therefore more cost efficient memory types are more suitable for deep analytics.

The number of IoT devices that operate and provide data to any given IoT application may grow rapidly, and planning for this growth may also be cost prohibitive using current approaches. Therefore, a more cost efficient storage solution for IoT applications that utilize real-time analytics and deep analytics would be beneficial, but is currently unavailable.

SUMMARY

In one embodiment, a method includes determining a data record partition size based on resources used for transferring data from a higher storage tier that includes first memory to one or more lower storage tiers that include second memory. The higher storage tier has an average memory access time that is less than any of the one or more lower storage tiers. The method also includes determining which data records stored to the higher storage tier are suitable for export to the one or more lower storage tiers. Also, the method includes determining a distribution mapping of the first memory, the distribution mapping indicating a relative distribution of storage locations for all of the data records that are stored to the higher storage tier. In addition, the method includes identifying all sets of contiguously stored data records on the higher storage tier that are suitable for export and greater in size than the data record partition size. Moreover, the method includes logically sorting, in a descending order of size, the sets of contiguously stored data records and sending a list of logically sorted sets of contiguously stored data records to an exporter.

In another embodiment, a system includes a higher storage tier having first memory, one or more lower storage tiers having second memory, a processing circuit, and logic integrated with the processing circuit, executable by the processing circuit, or integrated with and executable by the processing circuit. The higher storage tier has an average memory access time that is less than any of the one or more lower storage tiers, and the logic is configured to cause the processing circuit to determine a data record partition size based on resources used for transferring data from the higher storage tier. The logic is also configured to cause the processing circuit to determine which data records stored to the higher storage tier are suitable for export to the one or more lower storage tiers. Also, the logic is configured to cause the processing circuit to determine a distribution mapping of the first memory, the distribution mapping indicating a relative distribution of storage locations for all of the data records that are stored to the higher storage tier. In addition, the logic is configured to cause the processing circuit to identify all sets of contiguously stored data records on the higher storage tier that are suitable for export and greater in size than the data record partition size. Moreover, the logic is configured to cause the processing circuit to logically sort, in a descending order of size, the sets of contiguously stored data records and send a list of logically sorted sets of contiguously stored data records to an exporter.

In another embodiment, a computer program product includes a computer readable storage medium having program instructions embodied therewith. The embodied program instructions are executable by a processing circuit to cause the processing circuit to determine, by the processing circuit, a data record partition size based on resources used for transferring data from a higher storage tier, the higher storage tier having a first memory. The embodied program instructions are also executable by the processing circuit to cause the processing circuit to determine, by the processing circuit, which data records stored to the higher storage tier are suitable for export to one or more lower storage tiers, the one or more lower storage tiers having a second memory. The higher storage tier has an average memory access time that is less than any of the one or more lower storage tiers. Also, the embodied program instructions are executable by the processing circuit to cause the processing circuit to determine, by the processing circuit, a distribution mapping of the first memory, the distribution mapping indicating a relative distribution of storage locations for all of the data records that are stored to the higher storage tier. In addition, the embodied program instructions are executable by the processing circuit to cause the processing circuit to identify, by the processing circuit, all sets of contiguously stored data records on the higher storage tier that are suitable for export and greater in size than the data record partition size. Moreover, the embodied program instructions are executable by the processing circuit to cause the processing circuit to logically sort, by the processing circuit in a descending order of size, the sets of contiguously stored data records, and send, by the processing circuit, a list of logically sorted sets of contiguously stored data records to an exporter.

Other aspects and embodiments of the present invention will become apparent from the following detailed description, which, when taken in conjunction with the drawings, illustrate by way of example the principles of the invention.

DETAILED DESCRIPTION

Figure 1:
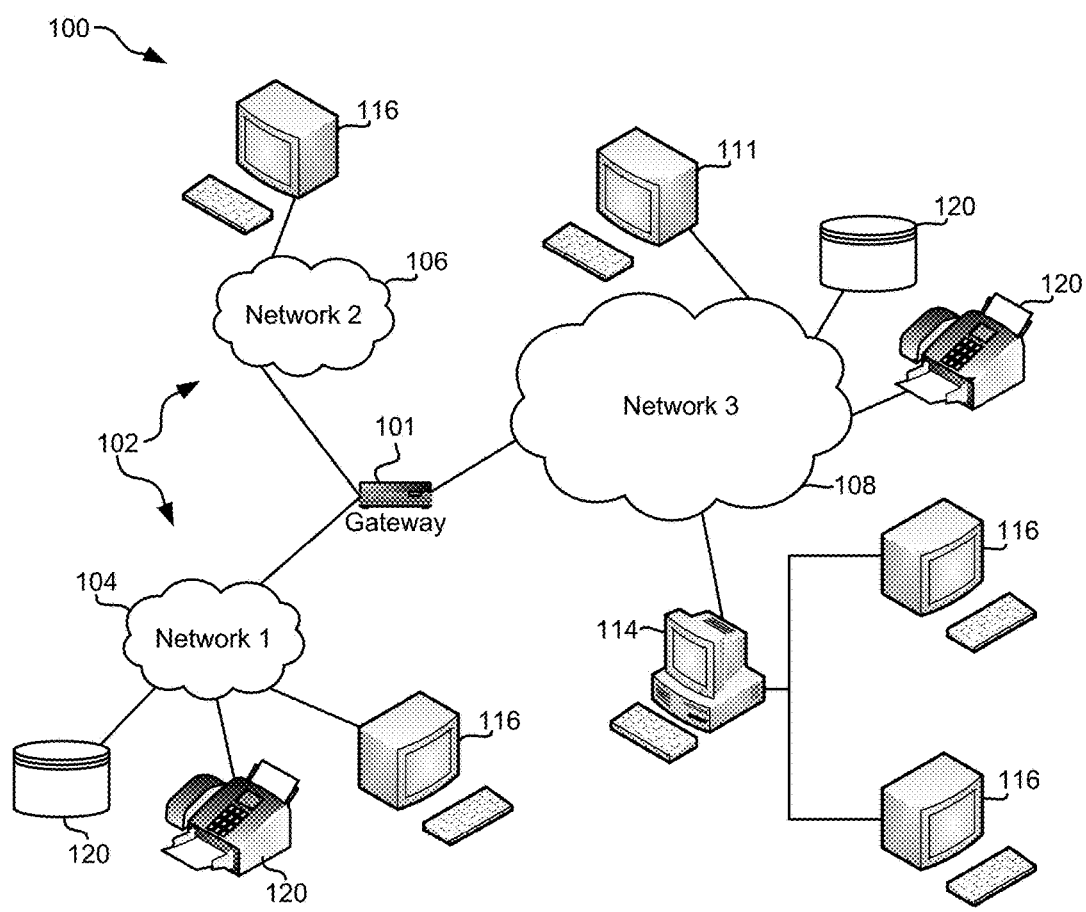
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The term "about" as used herein indicates the value preceded by the term "about," along with any values reasonably close to the value preceded by the term "about," as would be understood by one of skill in the art. When not indicated otherwise, the term "about" denotes the value preceded by the term "about"±10% of the value. For example, "about 10" indicates all values from and including 9.0 to 11.0.

The following description discloses several preferred embodiments of systems, methods, and computer program products for efficient export scheduling using index and schema to determine data distribution.

In one general embodiment, a method includes determining a data record partition size based on resources used for transferring data from a higher storage tier that includes first memory to one or more lower storage tiers that include second memory. The higher storage tier has an average memory access time that is less than any of the one or more lower storage tiers. The method also includes determining which data records stored to the higher storage tier are suitable for export to the one or more lower storage tiers. Also, the method includes determining a distribution mapping of the first memory, the distribution mapping indicating a relative distribution of storage locations for all of the data records that are stored to the higher storage tier. In addition, the method includes identifying all sets of contiguously stored data records on the higher storage tier that are suitable for export and greater in size than the data record partition size. Moreover, the method includes logically sorting, in a descending order of size, the sets of contiguously stored data records and sending a list of logically sorted sets of contiguously stored data records to an exporter.

In another general embodiment, a system includes a higher storage tier having first memory, one or more lower storage tiers having second memory, a processing circuit, and logic integrated with the processing circuit, executable by the processing circuit, or integrated with and executable by the processing circuit. The higher storage tier has an average memory access time that is less than any of the one or more lower storage tiers, and the logic is configured to cause the processing circuit to determine a data record partition size based on resources used for transferring data from the higher storage tier. The logic is also configured to cause the processing circuit to determine which data records stored to the higher storage tier are suitable for export to the one or more lower storage tiers. Also, the logic is configured to cause the processing circuit to determine a distribution mapping of the first memory, the distribution mapping indicating a relative distribution of storage locations for all of the data records that are stored to the higher storage tier. In addition, the logic is configured to cause the processing circuit to identify all sets of contiguously stored data records on the higher storage tier that are suitable for export and greater in size than the data record partition size. Moreover, the logic is configured to cause the processing circuit to logically sort, in a descending order of size, the sets of contiguously stored data records and send a list of logically sorted sets of contiguously stored data records to an exporter.

In yet another general embodiment, a computer program product includes a computer readable storage medium having program instructions embodied therewith. The embodied program instructions are executable by a processing circuit to cause the processing circuit to determine, by the processing circuit, a data record partition size based on resources used for transferring data from a higher storage tier, the higher storage tier having a first memory. The embodied program instructions are also executable by the processing circuit to cause the processing circuit to determine, by the processing circuit, which data records stored to the higher storage tier are suitable for export to one or more lower storage tiers, the one or more lower storage tiers having a second memory. The higher storage tier has an average memory access time that is less than any of the one or more lower storage tiers. Also, the embodied program instructions are executable by the processing circuit to cause the processing circuit to determine, by the processing circuit, a distribution mapping of the first memory, the distribution mapping indicating a relative distribution of storage locations for all of the data records that are stored to the higher storage tier. In addition, the embodied program instructions are executable by the processing circuit to cause the processing circuit to identify, by the processing circuit, all sets of contiguously stored data records on the higher storage tier that are suitable for export and greater in size than the data record partition size. Moreover, the embodied program instructions are executable by the processing circuit to cause the processing circuit to logically sort, by the processing circuit in a descending order of size, the sets of contiguously stored data records, and send, by the processing circuit, a list of logically sorted sets of contiguously stored data records to an exporter.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a local area network (LAN), a wide area network (WAN) such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
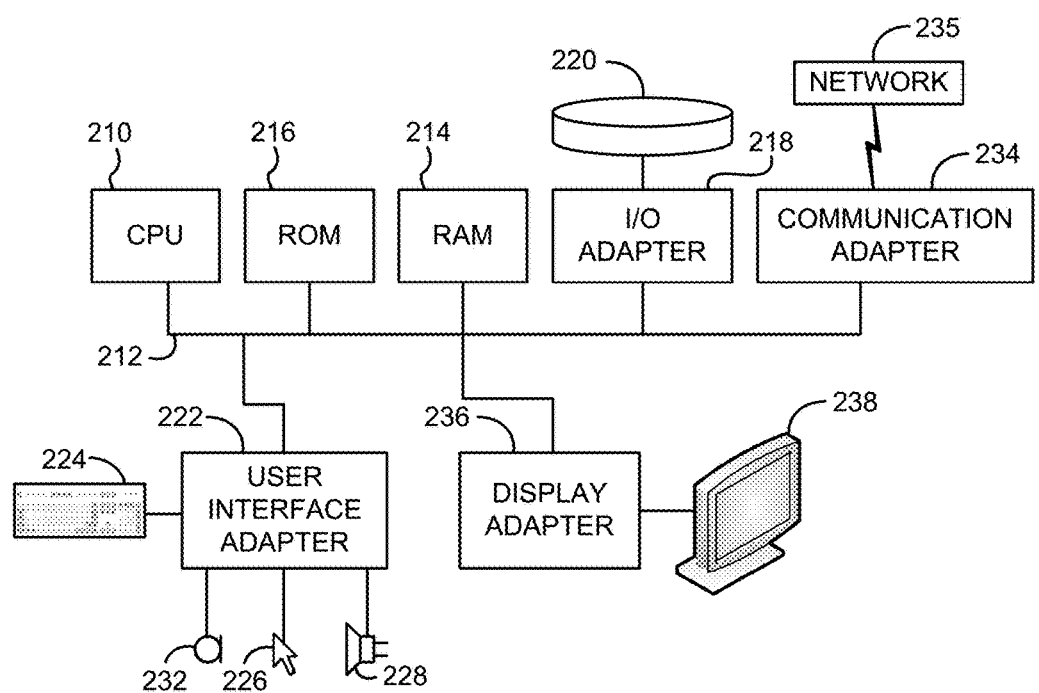
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using XML, C, and/or C++ language, or other programming languages, along with an object oriented programming methodology. Object oriented programming (OOP), which has become increasingly used to develop complex applications, may be used.

According to one embodiment, a remote controlled device may be unlocked in response to an authentication process that authorizes the user of the remote controlled device to fully use the available functionality of the remote controlled device. The authentication process, in a further embodiment, may rely on validation of a predetermined number, profile, or some other identification information that the user is required to provide to a validation service via a remote controller. Moreover, in yet another embodiment, the user may be required to provide the identification information in an ongoing basis while operating the remote controlled device.

Figure 3:
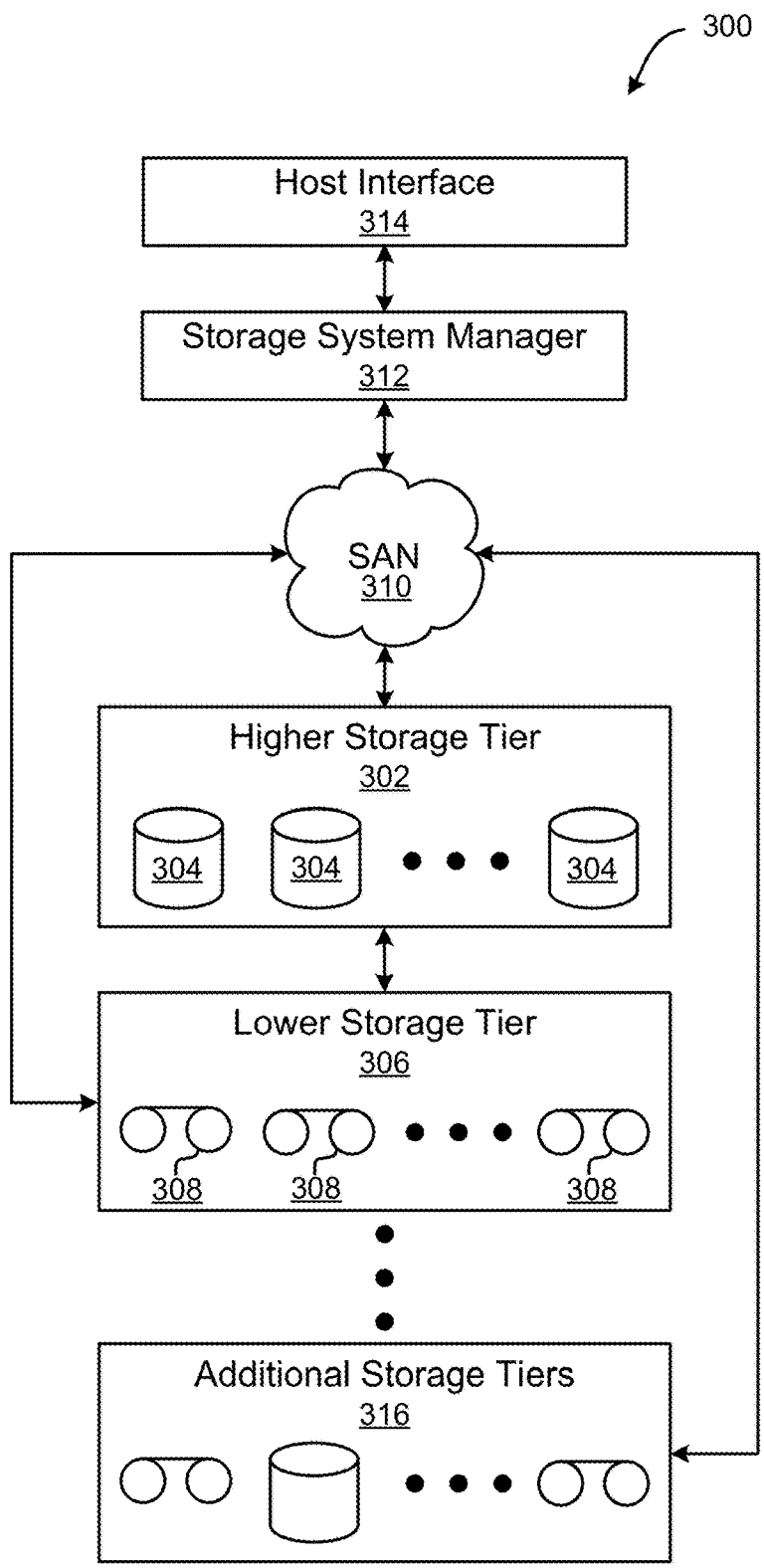
FIG. 3 illustrates a tiered data storage system in accordance with one embodiment.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media on at least one higher storage tier 302 and at least one lower storage tier 306. The higher storage tier(s) 302 preferably may include one or more random access and/or direct access media 304, such as nonvolatile memory (NVM), solid state memory in solid state drives (SSDs), flash memory, SSD arrays, flash memory arrays, hard disks in hard disk drives (HDDs), etc., and/or others noted herein or known in the art. The lower storage tier(s) 306 may preferably include one or more lower performing storage media 308, including slower accessing HDDs, sequential access media such as magnetic tape in tape drives and/or optical media, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 302, may include a majority of SSD storage media (up to and including all SSD storage media) for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

In one particular embodiment, the storage system 300 may include a combination of SSDs and HDDs, with the higher storage tier 302 including SSDs (and possibly some buffer memory) and the lower storage tier 306 including HDDs (and possibly some buffer memory). According to another embodiment, the storage system 300 may include a combination of SSDs and magnetic tape with magnetic tape drives, with the higher storage tier 302 including SSDs (and possibly some buffer memory) and the lower storage tier 306 including magnetic tape (and possibly some buffer memory) and magnetic tape drives for accessing data from the magnetic tapes. In yet another embodiment, the storage system 300 may include a combination of HDDs and magnetic tape, with the higher storage tier 302 including HDDs (and possibly some buffer memory) and the lower storage tier 306 including magnetic tape (and possibly some buffer memory).

According to some embodiments, the storage system (such as 300) may include logic configured to optimize the use of system resources during data export operations. Data export is the process of moving data stored to the higher storage tier 302 to the lower storage tier 306 and/or to any of the additional storage tiers 316. The data export process is performed in response to a triggering event.

Any suitable triggering event may be used to cause the data export process to begin. Exemplary triggering events include, but are not limited to, expiration of a timer (that may be set when the data is initially stored to the higher storage tier 302, set after each time a particular portion of data is last accessed, etc.), an amount of time that the data has resided on the higher storage tier 302 exceeding a threshold resident time period (such as 1 minute, 2 minutes, 5 minutes, 30 minutes, 1 hour, 4 hours, 1 day, etc.), an amount of time since a particular portion of the data was last accessed while being stored on the higher storage tier 302 exceeding a threshold last access time period (such as 1 minute, 2 minutes, 5 minutes, 30 minutes, 1 hour, 4 hours, 1 day, etc.), receipt of an explicit command to move a particular portion of data, an amount of total data stored to the higher storage tier 302 exceeding a storage space threshold, an amount of time needed to access data stored to the higher storage tier 302 exceeding a predetermined time threshold, or any other suitable triggering event. The storage space threshold may be based on any suitable measurement of data stored to the higher storage tier 302, such as a total amount of data stored to the higher storage tier 302 measured in bytes, kilobytes, megabytes, gigabytes, terabytes, etc. (e.g., 100 MB, 1 GB, 1 TB, etc.), a percentage of total storage on the higher storage tier 302 (e.g., 50% of total storage space, 75% of total storage space, 90% of total storage space, 98% of total storage space, etc.), etc.

System resources include any measurable system characteristic that enables and/or limits the ability of the system 300 to process, store, retrieve, and/or analyze data. Exemplary system resources include, but are not limited to, storage bandwidth (which measures an amount of data that is able to be stored to and managed effectively on the higher storage tier 302 and may take into account a distribution of the data stored to the higher storage tier 302), network bandwidth (which measures an amount of data that is able to be transferred from the higher storage tier 302 to the lower storage tier 306 and/or to any of the additional storage tiers 316 across various connections and/or links between the storage tiers over a certain period of time, e.g., 1 MB/sec., 100 MB/sec., 1 GB/sec., etc., and is affected by the physical connections and/or links that couple the higher storage tier 302 to the lower storage tier 306 and/or any of the additional storage tiers 316), and processor capacity (which measures an ability to process data for exporting the data to a lower tier of one or more processors within the system 300, such as a CPU, microprocessor, etc.).

Of course, this logic may be implemented as a method on any device and/or system or as a computer program product, according to various embodiments.

Figure 4:
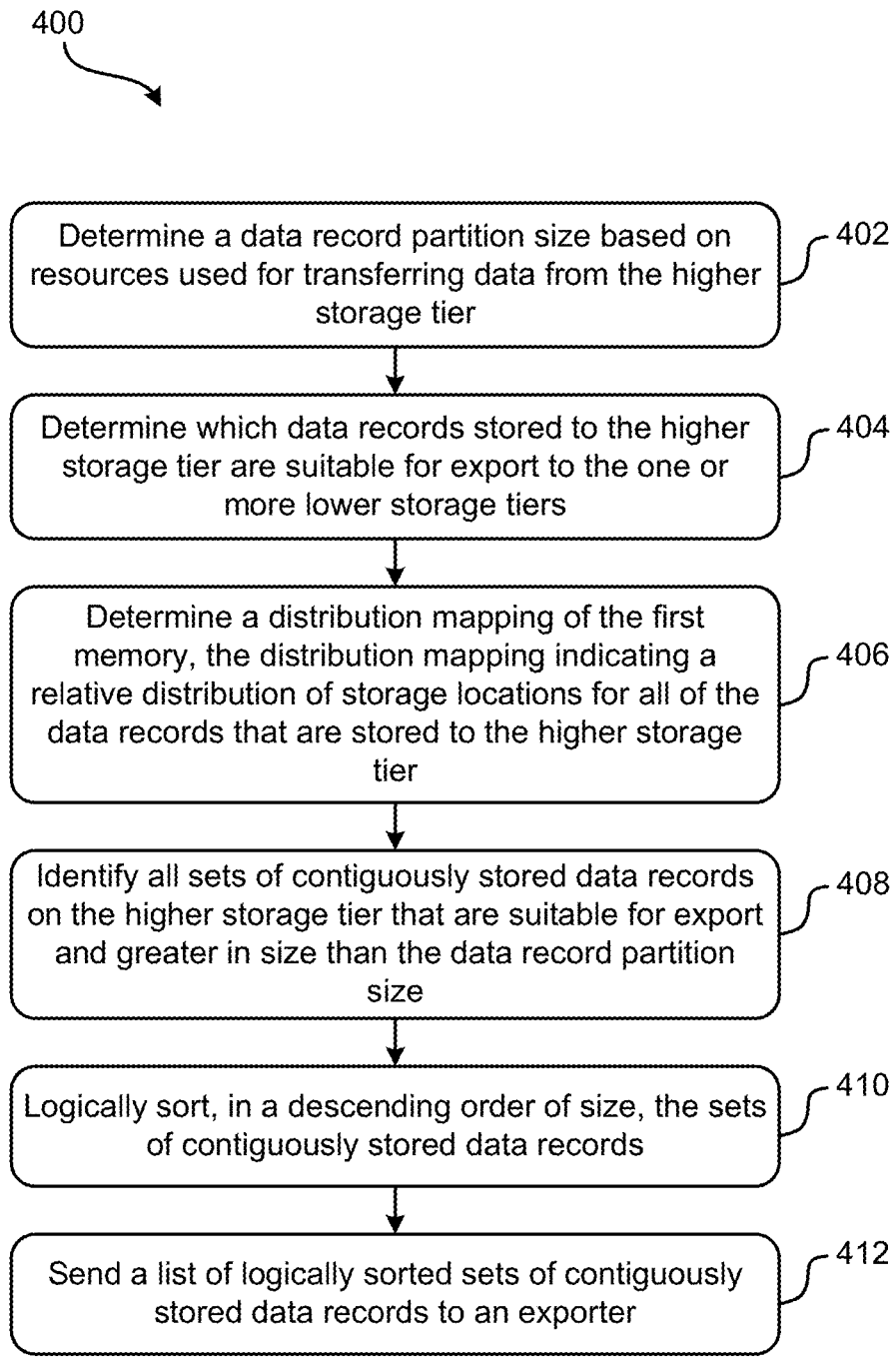
FIG. 4 shows a flowchart of a method, according to one embodiment.

Now referring to FIG. 4, a method 400 is shown according to one embodiment. The method 400 may be performed in accordance with the present invention in any of the environments depicted in FIGS. 1-3, among others, in various embodiments. Of course, more or less operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by a server, a mainframe computer, a server hosting one or more virtual machines (VMs), a processing circuit having one or more processors therein, or some other device having one or more processors therein. The processing circuit, e.g., processor(s), chip(s), and/or module(s) implemented in hardware and/or software, and preferably having at least one hardware component, may be utilized in any device to perform one or more steps of the method 400. Illustrative processors include, but are not limited to, a CPU, an ASIC, a FPGA, etc., combinations thereof, or any other suitable computing device known in the art.

As shown in FIG. 4, method 400 may start with operation 402, where a data record partition size is determined. The size of the data record partition is based on potential use of resources used for transferring data from a higher storage tier to one or more lower storage tiers. The higher storage tier comprises first memory, the one or more lower storage tiers comprise second memory, and the higher storage tier has an average memory access time that is less than any of the one or more lower storage tiers. In this way, the higher storage tier is used for data that is able to be accessed quickly, while the one or more lower storage tiers are used for data that is to be stored more long term, with less demand for fast access. This is a hierarchical storage structure that may be managed by hierarchical storage management (HSM) software or some other suitable system.

In one embodiment, the resources used for transferring data from the higher storage tier may include any measurable resource available for transferring data between the storage tiers. Three such resources include, but are not limited to: processor capacity, storage bandwidth, and network bandwidth.

Storage bandwidth is used to describe data distribution of the data stored to the higher storage tier as queried from an index such that data records that are stored contiguously may be identified versus data records that are stored in a random or spread non-uniform patterns. This allows for a data selection technique to be chosen, such as point iteration or full scans of the storage tier for exporting the data therefrom.

In one embodiment, the data record partition size may be selected to maximize a transfer speed of exporting data from the higher storage tier to the one or more lower storage tiers. In another embodiment, the data record partition size may be selected to minimize processor threads used during exporting of data from the higher storage tier to the one or more lower storage tiers. In yet another embodiment, the data record partition size may be selected to maintain data transmission rates to be less than or equal to transmission capacity of network connections between the higher storage tier and the one or more lower storage tiers. Any of these embodiments may be used in conjunction with one another, to balance multiple resources simultaneously.

In operation 404, it is determined which data records stored to the higher storage tier are suitable for export to the one or more lower storage tiers. By suitable for export, what is meant is that one or more criteria have been met with respect to the data records that indicate that the data records should be moved to other tiers in the hierarchical storage system to provide storage space on the higher storage tier for more deserving data. These criteria may include time on the higher storage tier, explicit request to move, insufficient space on the higher storage tier to store new data, etc.

According to one embodiment, the higher storage tier and at least one of the one or more lower storage tiers may be located locally, e.g., on a same network, in a same facility or storage system, etc. In this way, the export operation is performed locally when transferring data from the higher storage tier to at least one of the one or more lower storage tiers.

In another embodiment, the higher storage tier and at least one of the one or more lower storage tiers may be located remotely, e.g., on different networks, in different facilities or storage systems located geographically distant from one another, etc. In this way, the export operation is performed remotely across a network that connects the distant locations where the higher storage tier and the at least one of the one or more lower storage tiers are located when transferring data from the higher storage tier to at least one of the one or more lower storage tiers.

In one embodiment, the determination of which data records stored to the higher storage tier are suitable for export may be based on detection of a triggering event, such as those described herein and others known in the art. The triggering event may cause the determination to be made, such that operations 406-412 may be executed.

In operation 406, a distribution mapping of the first memory is determined. The distribution mapping indicates a relative distribution of storage locations for all of the data records that are stored to the higher storage tier. With this distribution mapping, it is possible to determine which data records are strung together in long, contiguous sets, and which data records are spread across the first memory in small chunks or even alone, with little or no correlation with other data records on the first memory.

In operation 408, all sets of contiguously stored data records on the higher storage tier that are suitable for export and greater in size than the data record partition size are identified. This size threshold (the data partition size) is used as a measurement against which the size of sets of contiguously stored data records may be measured, to ensure that sets that are smaller in size than the data partition size are passed over until later, as this size of set does not provide for optimal exporting of the data records from the higher storage tier.

In operation 410, the sets of contiguously stored data records are logically sorted in a descending order of size (largest size first, smallest size last). This creates a list of logically sorted sets of contiguously stored data records. The list may be in any suitable form, such as a spreadsheet, database file, table, etc., and preferably may include information about each set of contiguously stored data records that are included on the list, such as a storage location, starting data record location, ending data record location, file name(s), metadata, last access time, creation date, etc.

In operation 412, the list of logically sorted sets of contiguously stored data records are sent to an exporter. The exporter is tasked with the actual transfer of the data records from the list to at least one of the lower storage tiers (possibly sending different data records or sets of data records to different lower storage tiers, according to some desired storage scheme.

In one embodiment, method 400 may include transmitting, from the higher storage tier to at least one of the lower storage tiers, by the exporter in the descending order of size, each set of contiguously stored data records from the list of logically sorted sets of contiguously stored data records. The sets of contiguously stored data records may be exported within an age-out window that restricts an amount of time that data may reside on the higher storage tier.

In a further embodiment, method 400 may include determining a number of processor threads (used in one processing circuit or across more than one processing circuits) to use for transmission of a first set of contiguously stored data records that minimizes use of the resources based on a size of the first set of contiguously stored data records. With each subsequent sets of contiguously stored data records that are to be transmitted to the one or more lower storage tiers, the number of processor threads to use for the transmission may be recalculated in order to minimize the use of the resources based on the respective sizes of the subsequent sets of contiguously stored data records.

According to another embodiment, method 400 may include transmitting, from the higher storage tier to the one or more lower storage tiers, by the exporter using dynamic object sizing, all remaining data records that are suitable for export and are not included on the list of logically sorted sets of contiguously stored data records. In this transmission process of the remaining data records that are suitable for export, empty regions in the first memory of the higher storage tier may be skipped. This conserves resources, as empty space does not need to be transmitted, and therefore may be skipped during reading of the data initially.

In this embodiment, method 400 may include determining an object size and a number of processor threads to use for transmission of a first data record or a first set of data records of the remaining data records that minimizes use of the resources based on a size of the first data record or the first set of data records. With each subsequent data record or set of data records that are to be transmitted to the one or more lower storage tiers, the number of processor threads to use for the transmission may be recalculated in order to minimize the use of the resources based on the respective sizes of the data record or set of data records.

Method 400 may be implemented in a system and/or a computer program product. For example, a system may include a processing circuit and logic integrated with the processing circuit, executable by the processing circuit, or integrated with and executable by the processing circuit. By integrated with, what is meant is that the processing circuit is a hardware processor that has hardcoded logic included therewith, such as an ASIC, a FPGA, etc. By executable by, what is meant is that the processor is configured to execute software logic to achieve functionality dictated by the software logic, with the processor possibly being a CPU, a microprocessor, etc. The logic is configured to cause the processing circuit to perform method 400.

In another example, a computer program product may include a computer readable storage medium having program instructions embodied therewith. The computer readable storage medium may be any suitable storage device known in the art that is configured to store and allow computer access to information stored therein. The embodied program instructions are executable by a processing circuit to cause the processing circuit to perform method 400.

Figure 5:
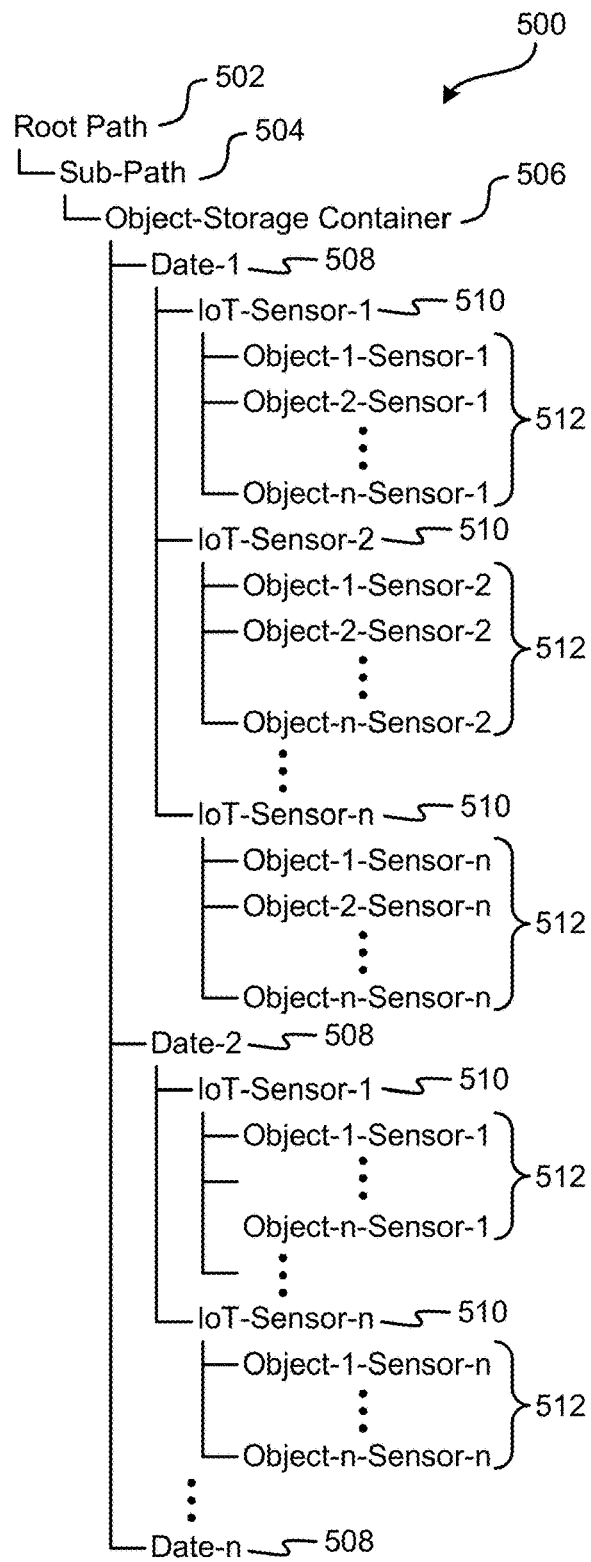
FIG. 5 shows a portion of a hierarchical storage scheme, according to one example.

Now referring to FIG. 5, a portion of a hierarchical storage scheme 500 is shown in accordance with one example for the collection of data from a system. As shown, the hierarchical storage scheme 500 includes a root path 502, a first sub-path 504 logically nestled below the root path 502, and an object-storage container 506 logically nestled below the first sub-path 504. The object-storage container 506 includes a plurality of data records 512 logically nestled within the object-storage container 506, each data record 512 being selectively positioned within individual directories 508 (and possibly within one or more levels of sub-directories 510).

In this example, IoT data is being collected on a day-to-day basis (with the date being used to denote the directories 508, e.g., Date-1, Date-2, . . . , Date-n) using a plurality of sensors (e.g., IoT-Sensor-1, IoT-Sensor-2, . . . , IoT-Sensor-n) with the name of the various sensors being used to denote the sub-directories 510 in which data is collected from each respective sensor (e.g., Object-1-Sensor-1, Object-2-Sensor-1, . . . , Object-n-Sensor-1, . . . , Object-n-Sensor-n). Any number of sub-paths 504, object-storage containers 506, directories 508, sub-directories 510, sensors or devices, and data records 512 may be included in the hierarchical storage scheme 500 as desired based on configuration of the system and sensors/devices included in the system for which data is being collected. Moreover, any number of levels of hierarchical partitioning may be included in the hierarchical storage scheme 500 as desired to provide a logical representation of the data that is collected from the system.

Of course, any hierarchical storage scheme may be used for representation and logical grouping of data collected from IoT sensors and devices that may include more or less of any of the logical structures described in FIG. 5. In addition, data may be collected from any device(s), sensor(s), system(s), channel(s), etc., that produce data on which real-time and deep analytics are desired to be performed.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an ASIC, a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a CPU, an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
   determining a data record partition size based on resources used for transferring data from a higher storage tier that comprises first memory to one or more lower storage tiers that comprise second memory, wherein the higher storage tier has an average memory access time that is less than any of the one or more lower storage tiers;
   determining which data records stored to the higher storage tier are suitable for export to the one or more lower storage tiers;
   determining a distribution mapping of the first memory, the distribution mapping indicating a relative distribution of storage locations for all of the data records that are stored to the higher storage tier;
   identifying all sets of contiguously stored data records on the higher storage tier that are suitable for export and greater in size than the data record partition size;
   logically sorting, in a descending order of size, the sets of contiguously stored data records;
   sending a list of logically sorted sets of contiguously stored data records to an exporter;
   transmitting from the higher storage tier to the one or more lower storage tiers, by the exporter in the descending order of size, each set of contiguously stored data records from the list of logically sorted sets of contiguously stored data records; and
   transmitting from the higher storage tier to the one or more lower storage tiers, by the exporter using dynamic object sizing, all remaining data records that are suitable for export and are not included on the list of logically sorted sets of contiguously stored data records, wherein empty regions in the first memory of the higher storage tier are skipped during transmission of the remaining data records that are suitable for export.

2. The method as recited in claim 1, further comprising determining a number of processor threads to use for transmission of a first set of contiguously stored data records that minimizes use of the resources based on a size of the first set of contiguously stored data records.

3. The method as recited in claim 1, further comprising determining an object size and a number of processor threads to use for transmission of a first data record or a first set of data records of the remaining data records that minimizes use of the resources based on a size of the first data record or the first set of data records.

4. The method as recited in claim 1, wherein the resources used for transferring data from the higher storage tier comprise: processor capacity, storage bandwidth, and network bandwidth.

5. The method as recited in claim 1, wherein the determining which data records stored to the higher storage tier are suitable for export is based on detection of a triggering event.

6. A system, comprising:
   a higher storage tier comprising first memory;
   one or more lower storage tiers comprising second memory, wherein the higher storage tier has an average memory access time that is less than any of the one or more lower storage tiers;

a processing circuit; and logic integrated with the processing circuit, executable by the processing circuit, or integrated with and executable by the processing circuit, the logic being configured to cause the processing circuit to:

determine a data record partition size based on resources used for transferring data from the higher storage tier;

determine which data records stored to the higher storage tier are suitable for export to the one or more lower storage tiers;

determine a distribution mapping of the first memory, the distribution mapping indicating a relative distribution of storage locations for all of the data records that are stored to the higher storage tier;

identify all sets of contiguously stored data records on the higher storage tier that are suitable for export and greater in size than the data record partition size;

logically sort, in a descending order of size, the sets of contiguously stored data records;

send a list of logically sorted sets of contiguously stored data records to an exporter;

transmit from the higher storage tier to the one or more lower storage tiers, by the exporter in the descending order of size, each set of contiguously stored data records from the list of logically sorted sets of contiguously stored data records; and transmit from the higher storage tier to the one or more lower storage tiers, by the exporter using dynamic object sizing, all remaining data records that are suitable for export and are not included on the list of logically sorted sets of contiguously stored data records, wherein empty regions in the first memory of the higher storage tier are skipped during transmission of the remaining data records that are suitable for export.

7. The system as recited in claim 6, wherein the logic is further configured to cause the processing circuit to:

determine a number of processor threads to use for transmission of a first set of contiguously stored data records that minimizes use of the resources based on a size of the first set of contiguously stored data records.

8. The system as recited in claim 6, wherein the logic is further configured to cause the processing circuit to:

determine an object size and a number of processor threads to use for transmission of a first data record or a first set of data records of the remaining data records that minimizes use of the resources based on a size of the first data record or the first set of data records.

9. The system as recited in claim 6, wherein the resources used for transferring data from the higher storage tier comprise: processor capacity, storage bandwidth, and network bandwidth.

10. The system as recited in claim 6, wherein the logic configured to cause the processing circuit to determine which data records stored to the higher storage tier are suitable for export is based on detection of a triggering event.

11. A computer program product, the computer program product comprising a computer readable storage medium having program instructions embodied therewith, the embodied program instructions being executable by a processing circuit to cause the processing circuit to:

determine, by the processing circuit, a data record partition size based on resources used for transferring data from a higher storage tier, the higher storage tier comprising a first memory;

determine, by the processing circuit, which data records stored to the higher storage tier are suitable for export to one or more lower storage tiers, the one or more lower storage tiers comprising a second memory, wherein the higher storage tier has an average memory access time that is less than any of the one or more lower storage tiers;

determine, by the processing circuit, a distribution mapping of the first memory, the distribution mapping indicating a relative distribution of storage locations for all of the data records that are stored to the higher storage tier;

identify, by the processing circuit, all sets of contiguously stored data records on the higher storage tier that are suitable for export and greater in size than the data record partition size;

logically sort, by the processing circuit in a descending order of size, the sets of contiguously stored data records;

send, by the processing circuit, a list of logically sorted sets of contiguously stored data records to an exporter;

transmit, by the processing circuit from the higher storage tier to the one or more lower storage tiers, in the descending order of size, each set of contiguously stored data records from the list of logically sorted sets of contiguously stored data records;

determine, by the processing circuit, a number of processor threads to use for transmission of a first set of contiguously stored data records that minimizes use of the resources based on a size of the first set of contiguously stored data records;

transmit, by the processing circuit from the higher storage tier to the one or more lower storage tiers, via the exporter using dynamic object sizing, all remaining data records that are suitable for export and are not included on the list of logically sorted sets of contiguously stored data records, wherein empty regions in the first memory of the higher storage tier are skipped during transmission of the remaining data records that are suitable for export; and determine, by the processing circuit, an object size and a number of processor threads to use for transmission of a first data record or a first set of data records of the remaining data records that minimizes use of the resources based on a size of the first data record or the first set of data records.

12. The computer program product as recited in claim 11, wherein the resources used for transferring data from the higher storage tier comprise: processor capacity, storage bandwidth, and network bandwidth.

13. The computer program product as recited in claim 11, wherein the embodied program instructions that cause the processing circuit to determine which data records stored to the higher storage tier are suitable for export is based on detection of a triggering event.

* * * * *